United States Patent
Falk et al.

(10) Patent No.: US 8,428,326 B2
(45) Date of Patent: Apr. 23, 2013

(54) SYSTEMS AND METHODS FOR ULTRASOUND SIMULATION USING DEPTH PEELING

(75) Inventors: Robert B. Falk, Takoma Park, MD (US); Tamas Perlaki, Budapest (HU); Milan Ikits, Sunnyvale, CA (US)

(73) Assignee: Immersion Corporation, San Jose, CA (US)

(*) Notice: Subject to any disclaimer, the term of this patent is extended or adjusted under 35 U.S.C. 154(b) by 790 days.

(21) Appl. No.: 12/604,569

(22) Filed: Oct. 23, 2009

(65) Prior Publication Data

US 2010/0104162 A1 Apr. 29, 2010

Related U.S. Application Data

(60) Provisional application No. 61/107,994, filed on Oct. 23, 2008, provisional application No. 61/108,422, filed on Oct. 24, 2008, provisional application No. 61/152,894, filed on Feb. 16, 2009.

(51) Int. Cl.
*G06K 9/00* (2006.01)
*A61B 5/05* (2006.01)
*A61B 6/00* (2006.01)

(52) U.S. Cl.
USPC .............. 382/131; 382/132; 600/407; 378/20

(58) Field of Classification Search .................. 382/131, 382/132; 600/407; 378/20
See application file for complete search history.

(56) References Cited

U.S. PATENT DOCUMENTS

| | | | |
|---|---|---|---|
| 4,961,138 A | 10/1990 | Gorniak | |
| 5,088,046 A | 2/1992 | McMurtry | |
| 5,181,181 A | 1/1993 | Glynn | |
| 5,273,038 A | 12/1993 | Beavin | |
| 5,296,846 A | 3/1994 | Ledley | |
| 5,371,778 A * | 12/1994 | Yanof et al. | 378/4 |
| 5,482,472 A | 1/1996 | Garoni et al. | |

(Continued)

FOREIGN PATENT DOCUMENTS

| | | |
|---|---|---|
| DE | 10258952 | 8/2004 |
| JP | H04-332544 | 11/1992 |

(Continued)

OTHER PUBLICATIONS

Everitt, C., Interactive Order-Independent Transparency, NVIDIA OpenGL Applications Engineering, NVIDIA Proprietary 2001.

(Continued)

*Primary Examiner* — Alexander H Taningco
(74) *Attorney, Agent, or Firm* — Kilpatrick Townsend & Stockton LLP

(57) ABSTRACT

Systems and methods for ultrasound simulation using depth peeling are disclosed. In one disclosed embodiment, a method includes the steps of receiving a sensor signal including a position and an orientation of a simulated ultrasound device, the position and orientation associated with a virtual physical environment comprising a first virtual object; determining a first peel associated with the first virtual object; determining a second peel associated with the first virtual object; determining a first characteristic of a pixel located between the first peel and the second peel; generating a display signal based on the first characteristic, the display signal configured to cause a visual display of the virtual physical environment; and outputting the display signal to a display device.

21 Claims, 11 Drawing Sheets

U.S. PATENT DOCUMENTS

| | | | |
|---|---|---|---|
| 5,546,943 | A | 8/1996 | Gould |
| 5,609,485 | A | 3/1997 | Bergman et al. |
| 5,690,485 | A | 11/1997 | Mangham et al. |
| 5,724,264 | A | 3/1998 | Rosenberg et al. |
| 5,769,640 | A | 6/1998 | Jacobus et al. |
| 5,882,206 | A | 3/1999 | Gillio |
| 5,920,395 | A * | 7/1999 | Schulz .................. 356/622 |
| 5,956,040 | A | 9/1999 | Asano et al. |
| 5,971,767 | A * | 10/1999 | Kaufman et al. ............ 434/267 |
| 6,117,078 | A | 9/2000 | Lysyansky et al. |
| 6,193,519 | B1 | 2/2001 | Eggert et al. |
| 6,210,168 | B1 | 4/2001 | Aiget et al. |
| 6,466,815 | B1 * | 10/2002 | Saito et al. .................. 600/429 |
| 6,608,628 | B1 * | 8/2003 | Ross et al. .................. 345/619 |
| 6,623,433 | B2 | 9/2003 | Webler et al. |
| 6,704,025 | B1 | 3/2004 | Bastos et al. |
| 6,726,638 | B2 | 4/2004 | Ombrellaro |
| 6,758,676 | B2 | 7/2004 | Eggert et al. |
| 7,430,490 | B2 | 9/2008 | Tong et al. |
| 7,835,892 | B2 | 11/2010 | Butsev et al. |
| 8,213,693 | B1 * | 7/2012 | Li ............................. 382/128 |
| 2003/0231789 | A1 * | 12/2003 | Willis et al. ................ 382/128 |
| 2005/0047636 | A1 * | 3/2005 | Gines et al. .................. 382/131 |
| 2005/0271302 | A1 | 12/2005 | Khamene et al. |
| 2006/0064007 | A1 | 3/2006 | Comaniciu et al. |
| 2006/0270932 | A1 | 11/2006 | Aharon et al. |
| 2011/0060579 | A1 * | 3/2011 | Butsev et al. .................. 703/11 |
| 2011/0098569 | A1 * | 4/2011 | Warmath et al. ............. 600/443 |

FOREIGN PATENT DOCUMENTS

| | | |
|---|---|---|
| JP | H07-171154 | 7/1995 |
| JP | 2002-336247 | 11/2002 |
| JP | 2003-061956 | 3/2003 |
| JP | 2003-067784 | 3/2003 |
| JP | 2003-319939 | 11/2003 |
| JP | 2004-070669 | 3/2004 |
| JP | 2004-070670 | 3/2004 |
| JP | 2004-159781 | 6/2004 |
| JP | 2004-171251 | 6/2004 |
| WO | WO 99/38141 | 7/1999 |
| WO | WO 02/094080 | 11/2002 |

OTHER PUBLICATIONS

Bates, Lisa M. et al., "A Method for Ultrasound Image Based Correction of Intraoperative Brain Shift," Proc. SPIE Medical Imaging 2000; Image Display and Visualization 3976: pp. 58-68.

Bro-Nielsen, Morten, "Finite Element Modeling in Surgery Simulation," Proceedings of The IEEE, vol. 86, No. 3, Mar. 1998, pp. 490-503.

Chen, Hongsheng et al., "Fast Voxelization of Three-Dimensional Synthetic Objects," Journal of Graphics Tools, vol. 3, No. 4, 1998, pp. 33-45.

Freidlin Raisa Z. et al., "NIHmagic: 3D Visualization, Registration and Segmentation Tool," 28th AIPR Workshop: 3D Visualization for Data Exploration and Decision Making, Proc. of SPIE vol. 3905, 2000, pp. 8 pages.

Hesina, Gerd et al., "Distributed Open Inventor: A Practical Approach to Distributed 3D Graphics," Vienna University of Technology, Austria, 1999, pp. 74-81.

Iwata, Hiroo et al., "Volume Haptization", Institute of Engineering Mechanics, 1993, pp. 16-23.

Kreeger, Kevin et al., "Mixing Translucent Polygons with Volumes," Dept. of Computer Science, SUNY at Stony Brook, 1999, pp. 191-199.

Minsky, Margaret et al., "Feeling and Seeing: Issues in Force Display," Dept. of Computer Science, 1990, pp. 235-242, 270.

Stanley, Michael C. et al., "Computer Simulation of Interacting Dynamic Mechanical Systems Using Distributed Memory Parallel Processors," DSC-vol. 42, Advances in Robotics, ASME 1992, pp. 55-61.

Su, S. Augustine et al., "The Virtual Panel Architecture: A 3D Gesture Framework," Computer Science Department, 1993, pp. 387-393.

Weiler, Manfred et al., "Direct Volume Rendering in OpenSG," Computers & Graphics 28, 2004, pp. 93-98.

Weiskopf, Daniel et al., "Volume Clipping via Per-Fragment Operations in Texture-Based Volume Visualization," Visualization and Interactive Systems Group, 2002, pp. 93-100.

Westermann, Rudiger et al., "Efficiently Using Graphics Hardware in Volume Rendering Applications," Computer Graphics Proceedings, Annual Conference Series, 1998, pp. 169-177.

Yamakita, M. et al., "Tele Virtual Reality of Dynamic Mechanical Model," Proceedings of the 1992 IEEE/RSJ International Conference on Intelligent Robots and Systems, Jul. 7-10, 1992, pp. 1103-1110.

Aiger et al., "Real-Time Ultrasound Imaging Simulation," 1998, 24 pages.

Cotin et al. "Real-Time Elastic Deformations of Soft Tissues for Surgery Simulation", IEEE Transactions of Visualization and Computer Graphics, vol. 5, No. 1, Jan.-Mar. 1999, pp. 62-73.

Ehricke, Hans-Heino, "SONOSim3D: A Multimedia System for Sonography Simulation and Education with an Extensible Case Database", European Journal of Ultrasound 7, 1998, pp. 225-230.

International Preliminary Report on Patentability, International Application No. PCT/US2005/031391, dated Apr. 3, 2007.

Japanese Patent Office, Notice for Reasons of Rejection, Application No. 2007-533500, dated May 11, 2010.

Maul et al. "Ultrasound Simulators: Experience with the SonoTrainer and Comparative Review of Other Training Systems", Ultrasound Obstet Gynecol, Aug. 4, 2004, pp. 581-585.

Office Action by UK Intellectual Property Office, Application No. GB0706763, dated Jul. 1, 2010.

Written Opinion of the International Searching Authority, Application No. PCT/US2005/031391, dated Mar. 1, 2006.

United States Patent and Trademark Office, Office Action, U.S. Appl. No. 10/950,766 mailed Dec. 28, 2007.

United States Patent and Trademark Office, Office Action, U.S. Appl. No. 10/950,766 mailed Jun. 28, 2007.

United States Patent and Trademark Office, Office Action, U.S. Appl. No. 10/950,766 mailed Aug. 11, 2008.

United States Patent and Trademark Office, Office Action, U.S. Appl. No. 10/950,766 mailed Feb. 2, 2009.

United States Patent and Trademark Office, Office Action, U.S. Appl. No. 10/950,766 mailed Jul. 13, 2009.

United States Patent and Trademark Office, Office Action, U.S. Appl. No. 12/946,551 mailed Jul. 18, 2011.

Japanese Patent Office, Notice for Reasons of Rejection, Application No. 2007-533500, dated Dec. 14, 2010.

Japanese Patent Office, Notice for Reasons of Rejection, Application No. 2007-533500, dated Jul. 5, 2011.

International Search Report and Written Opinion mailed Dec. 18, 2009 corresponding to PCT Patent Application No. US2009/061784.

* cited by examiner

SYSTEMS AND METHODS FOR ULTRASOUND SIMULATION USING DEPTH PEELING

CROSS-REFERENCES TO RELATED APPLICATION

This application claims priority to U.S. Provisional Patent Application No. 61/107,994 entitled "Ultrasound Simulation Using Depth-Peeling" filed Oct. 23, 2008, U.S. Provisional Patent Application No. 61/108,422 entitled "Ultrasound Simulation Using Depth-Peeling" filed Oct. 24, 2008, and U.S. Provisional Patent Application No. 61/152,894 entitled "Systems and Methods for Ultrasound Simulation Using Depth Peeling" filed Feb. 16, 2009, the entirety of all of which are hereby incorporated herein by reference.

FIELD OF THE INVENTION

This disclosure relates generally to graphical simulations, and more particularly to a systems and methods for ultrasound simulation using depth peeling.

BACKGROUND

One of the challenges of training persons to perform medical procedures is providing a realistic simulation of the procedure without using an actual live patient. For example, some medical procedures, such as endoscopic surgeries can be dangerous to a patient if performed by an unskilled practitioner. In other cases, it may be desirable to train a medical professional to handle a wide variety of scenarios, some of which may be relatively rare. Such scenarios can be difficult to train because live patients with the condition are seen infrequently. Therefore, simulations systems can be used to provide training to medical professionals without the need for a live patient or a patient with a particular condition. Conventional simulation systems may include a simulated medical device and a simulated patient to provide a more realistic, immersive simulation environment. Aspects of the simulated procedure may also be displayed on a screen to aid the user during the simulation. However, it is difficult to accurately and realistically simulate ultrasound procedures. Thus, there is a need for an ultrasound simulation that provides realistic simulated images to a trainee.

SUMMARY

Embodiments of the present invention provide systems and methods for ultrasound simulation using depth peeling. For example, in one embodiment, a method for ultrasound simulation using depth peeling comprises receiving a sensor signal comprising a position and an orientation of a simulated ultrasound device, the position and orientation associated with a virtual physical environment comprising a first virtual object; determining a first peel associated with the first virtual object; determining a second peel associated with the first virtual object; determining a first characteristic of a pixel located between the first peel and the second peel; generating a display signal based on the first characteristic, the display signal configured to cause a visual display of the virtual physical environment; and outputting the display signal to a display device. Another embodiment comprises a computer-readable medium comprising program code for executing such a method.

These illustrative embodiments are mentioned not to limit or define the invention, but to provide examples to aid understanding thereof. Illustrative embodiments are discussed in the Detailed Description, and further description of the invention is provided therein. Advantages offered by various embodiments of this invention may be further understood by examining this specification.

BRIEF DESCRIPTION OF THE DRAWINGS

Features, aspects, and advantages of the disclosure are better understood when the following Detailed Description is read with reference to the accompanying drawings, wherein.

DETAILED DESCRIPTION

Figure 1:
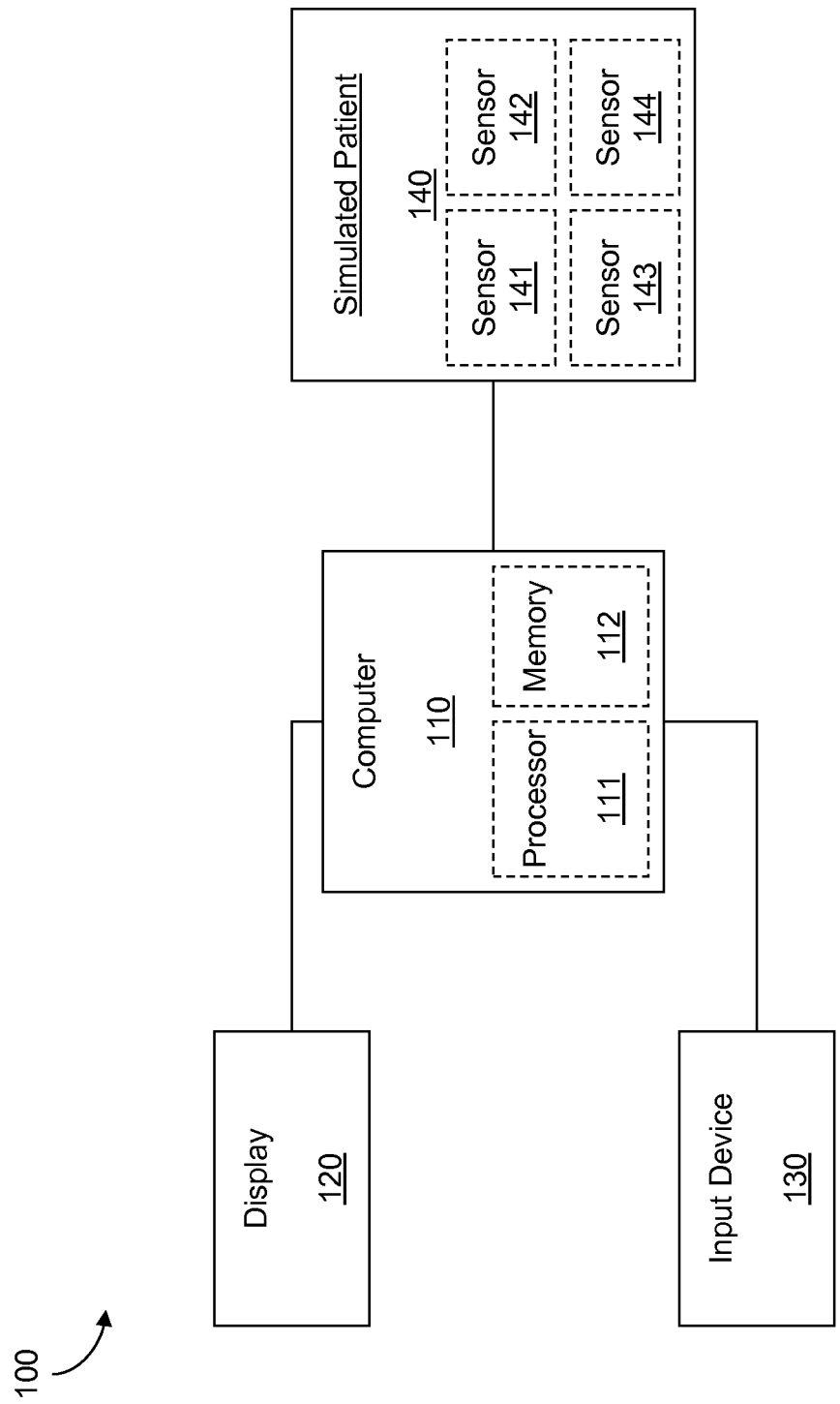
FIG. 1 shows one embodiment of a system for ultrasound simulation using depth-peeling.

Embodiments disclosed herein include systems and methods for simulating ultrasound procedures using depth peeling.

Illustrative System for Ultrasound Simulation Using Depth-Peeling

In one illustrative embodiment of the present invention, a user grasps a simulated ultrasound device and presses it against the abdomen of a simulated patient device, such as a mannequin. Sensors within the simulated patient sense the position and orientation of the simulated ultrasound device and send sensor signals to a processor executing ultrasound simulation software. The ultrasound simulation software stores representations of virtual objects that are "within" the simulated patient's abdomen. The processor analyzes the sensor signals and generates a simulated ultrasound image based on the position and orientation of the simulated ultrasound device relative to the positions and orientations of the virtual objects in the simulated patient's abdomen.

In this illustrative embodiment, the simulated physical patient does not actually include physical objects that may be detected by the simulated ultrasound device. Rather, the simulation software includes representations of virtual objects, such as internal organs, that have specific locations and orientations within a virtual environment that corresponds to the simulated physical patient. Thus, as a user moves the simulated ultrasound device across the abdomen of the simulated patient device, the simulation software translates received sensor signals into the position and orientation of the simulated ultrasound device. The position and orientation of the simulated ultrasound device may then be mapped into the virtual environment and the processor can determine the ultrasound image to be displayed as though the user were performing an actual ultrasound procedure.

To generate the simulated images for a user to view, the system employs depth peeling. To perform depth peeling, the system strips away pairs of surfaces, or "peels", in the virtual environment, determines characteristics of pixels located on or between the peels, and generates a display based on the determined characteristics. Such characteristics can include intensity information, color information, or other characteristics.

Each peel represents a visible surface of a virtual object. For example, a sphere would comprise two peels—the first peel comprises the upper visible surface of the sphere from a particular perspective. To determine the second peel, the first peel is stripped away and the now-visible interior rear surface of the sphere comprises the second peel. The system then "fills in" the interior of the sphere based on the pixels and other information about the object. Thus, the system analyzes the pixels on or between the peels, i.e. the pixels that make up the sphere. The system then moves to the next pair of peels until all objects have been analyzed, or until a maximum depth within the environment has been reached.

When the peeling process is completed, the accumulated pixel characteristics have all been built into an image, which may be subjected to post-processing, such as filtering. For example, Doppler information may be added to simulate movement over multiple images within the environment, such as to simulate blood flow. In addition, blur, noise, and erosion filters may be applied to provide a more realistic ultrasound image. Once all post-processing and filtering effects have been completed, the image is displayed to the user. This process may then be repeated to generate a number of frames per second to simulate a real-time ultrasound video display.

Referring now to FIG. 1, FIG. 1 shows one embodiment of a system for ultrasound simulation using depth-peeling. The system comprises a computer 110, a display 120, an input device 130, and a simulated patient device 140. The computer 110 comprises a processor 111 and a memory 112. Examples of suitable processors and memory devices are described below.

In the embodiment shown in FIG. 1, the simulated patient device 140 is a mannequin and comprises a plurality of sensors 141-144. The sensors are in communication with the processor 111 and are configured to detect a position and orientation of the input device. For example, in one embodiment, the simulated patient device 140 may comprise one or more pressure sensors configured to generate and transmit sensor signals indicating a degree of pressure at a location on the simulated patient device 140. In one embodiment, the simulated patient device 140 further comprises a patient processor (not shown) in communication with the sensors 141-144. In such an embodiment, the patient processor is in communication with the processor 111 and is configured to receive sensor signals from the sensors 141-144, to determine a position and orientation of the input device, and transmit a signal to the processor 111 with the position and orientation. In the embodiment shown in FIG. 1, four sensors 141-144 are used, however, in other embodiments, different numbers of sensors may be used. For example, in one embodiment comprising a simulated ultrasound device 130 to be inserted into a simulated patient, sensors may be disposed within the simulated patient device 140 to detect insertion and translational movement of the simulated ultrasound device. In such an embodiment, additional sensors may be used to detect rotational movement of the simulated ultrasound device.

In a further embodiment, the simulated patient device may comprise one or more actuators configured to provide haptic effects to the user. For example, in one embodiment, an actuator (not shown) is configured to output a haptic effect to simulate the presence of an object within the patient, such as providing resistance to pressure on the simulated patient device. In another embodiment, an actuator may be configured to simulate a heartbeat of a baby in the patient's womb.

In a further embodiment, an actuator may be configured to resist insertion of a simulated ultrasound device into an orifice in the simulated patent device, such as the patient's throat. In such embodiments, the actuator may be in communication with the processor 111, and the processor 111 is configured to generate an actuator signal to cause an actuator to output a haptic effect and to transmit the actuator signal to the actuator.

In the embodiment shown in FIG. 1, the input device 130 comprises a simulated ultrasound device (SUD). In the embodiment shown, the SUD is a user manipulatable device configured to appear like a standard hand-held ultrasound device. In another embodiment, other types of SUDs may be employed, such as probe-type SUDs that may be able to provide scans in up to 360-degrees of rotation about an axis. In the embodiment shown in FIG. 1, the SUD 130 comprises a housing that can be grasped and manipulated by a user. In some embodiments, the SUD 130 comprises a sensor for detecting a position or orientation of the SUD 130. For example, in one embodiment, the SUD 130 comprises six accelerometers for detecting a position and orientation of the SUD 130. In such an embodiment, three of the accelerometers are configured to detect the SUD's position in three-dimensional space—such as in each of an x, y, and z degree of translational freedom. In such an embodiment, the remaining three accelerometers are configured to detect rotational motion about each of the three translational axes of movement—i.e. rotation about the x, y, and z axes. In another embodiment, SUD 130 comprises a sensor for six degree-of-freedom tracking, such as a Polhemus™ PATRIOT™ sensor system, capable of detecting a magnetic field associated with the SUD 130 and determining a position, movement, or orientation of the device. In such embodiment each of the sensors may generate and transmit one or more sensor signals to indicate a position, movement, or orientation of the SUD 130.

In some embodiments, the SUD 130 may comprise sensors for detecting contact or pressure. For example, in one embodiment, the SUD 130 may comprise a sensor that detects whether the SUD 130 is in contact with the simulated patient device 140. In such an embodiment, a sensor may generate and transmit a sensor signal indicating contact with an object. SUDs 130 may comprise pressure sensors to detect and provide sensor signals indicating a degree of contact with an object, such as a simulated patent device 140. Such pressure signals may be employed to affect an appearance of a simulated ultrasound image. For example, a high degree of pressure may result in deformations of internal organs and structures, though it may provide a clearer simulated ultrasound images because the system may determine less ultrasound energy is lost between the SUD 130 and the simulated patient device 140 than if a low amount of pressure is detected.

In other embodiments, the SUD 130 may comprise other components, such as an on/off switch or a dial or switch for selecting a frequency of the simulated ultrasound waves to be used by the system. In one embodiment, the SUD 130 may comprise a button to cause a simulated ultrasound image to be generated.

To perform a simulated ultrasound procedure using depth peeling, a user executes simulation software stored in memory 112 on the computer 110. The simulation software comprises software having virtual objects of internal organs and tissue in an arrangement for a simulated patient. For example, a simulation of an obstetric ultrasound would likely include virtual objects of the patient's uterus, stomach, intestines, liver and the fetus. Other simulations may include tissues and organs found in other areas of the body. For example, in one embodiment, an ultrasound procedure includes taking an ultrasound in a 360-degree arc, such as in a 360-degree arc around a probe inside a patient's esophagus. In such an embodiment, the simulation software may comprise virtual objects representing a patient's lungs, heart, esophagus, ribs, and spine.

Embodiments of the present invention employ virtual objects to represent physical objects, such as internal organs, to help provide a realistic simulation experience. In one embodiment of the present invention, a virtual object comprises a plurality of polygons, such as triangles, that are connected to form a mesh defining the surface of the virtual object, leaving the interior of the object hollow. Suitable virtual objects may be constructed using standard graphical editing tools such as Autodesk® Maya® or Autodesk® 3ds Max®. The one or more virtual objects are then assigned locations and orientations within a virtual environment to emulate the position of internal organs within a patient. A user then manipulating the SUD over a portion of the simulated patient will visualize the internal organs and tissue that are intersected by the ultrasound plane within the virtual environment.

Once the simulation begins in one embodiment, the user brings the SUD 130 into contact with the simulated patient device 140. The plurality of sensors 141-144 detect the SUD 130 and transmit sensor signals to the processor 111, which determines the position and orientation of the SUD 130 with respect to the simulated patient device 140 based at least in part on the sensor signals. In another embodiment, the sensors 141-144 transmit sensor signals to a processor within the simulated patient device 140, which determines a position and orientation of the SUD and transmits the position and orientation to the processor 111. In still a further embodiment, the SUD 130 may comprise a processor and may be capable of receiving sensor signals from the sensors 141-144. The SUD 130 may then determine its position and orientation and transmit the position and orientation to the computer 110, such as over a wired connection (e.g. a USB connection) or over a wireless connection (e.g. a Bluetooth or WiFi connection).

After receiving the position and orientation of the SUD 130, the simulation software generates a simulated ultrasound image. The generated image is based on the position and orientation of the SUD 130 and simulates the image that might be displayed for an ultrasound probe oriented and positioned similarly on an actual patient. The simulation software also uses additional post-processing effects, such as blur, noise, or Doppler to create a more realistic simulated ultrasound image. The simulated ultrasound image is then transmitted to the display to be displayed to the user.

For example, in one embodiment, the position and orientation of the SUD 130 are used to determine a position and orientation of a virtual "camera" or perspective point into the virtual environment. The simulation software simulates the transmission of ultrasound waves into and through the virtual objects and the view provides the source of the ultrasound waves. Thus, the position of the camera helps determine how the simulation software should generate the display signal by indicating which virtual objects may be viewed and which portions of the virtual objects may be viewed.

Figure 2:
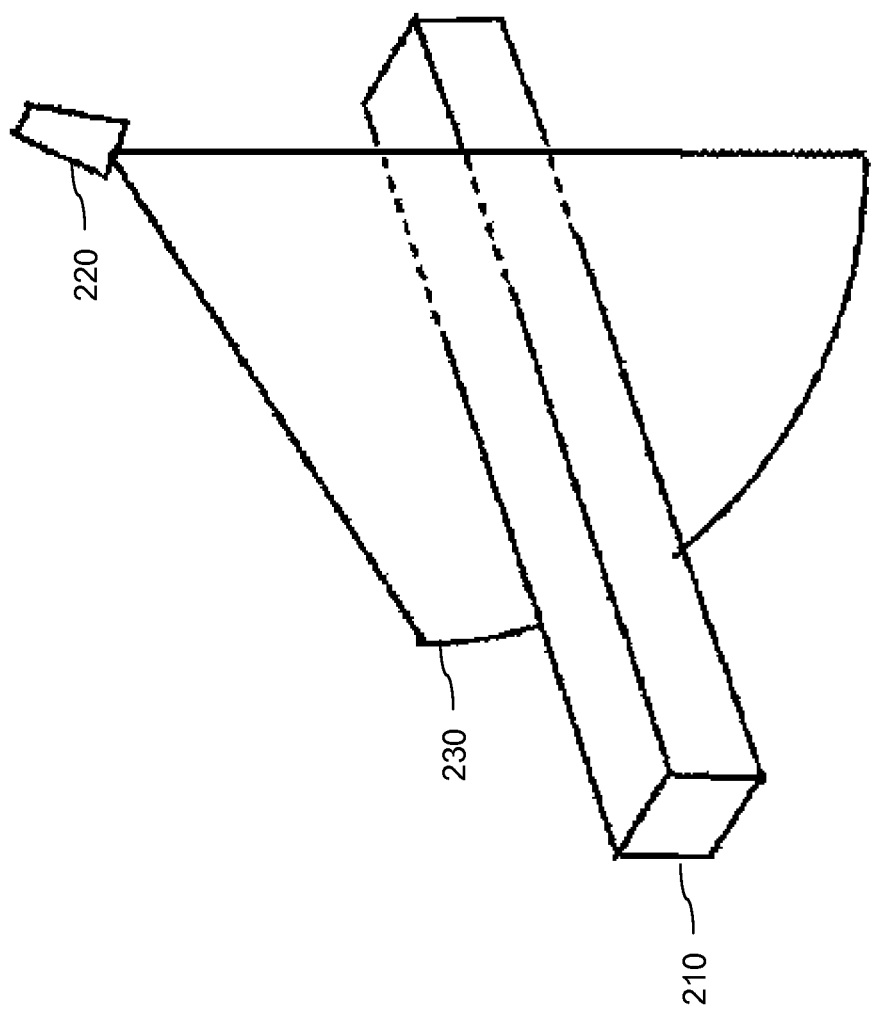
FIG. 2 shows a diagram of a virtual object and a perspective point according to one embodiment of system or method for ultrasound simulation using depth peeling.

For example, FIG. 2 shows a diagram of a virtual object 210 and a perspective point 220 according to one embodiment of system or method for ultrasound simulation using depth peeling. In the embodiment shown in FIG. 2, the position and orientation of the virtual camera 220 is based on the received position and orientation of the SUD 130. Plane 230 indicates the path of simulated ultrasound waves emitted from the position of the virtual camera into the graphical environment that. Some of the simulated ultrasound waves encounter the virtual object 210 and the simulation system determines a display signal based on the parts of the virtual object 210 encountered by the virtual ultrasound waves.

Illustrative Depth Peeling Method

To generate a display signal, the embodiment shown in FIG. 1 employs depth peeling to generate simulated ultrasound images to be displayed to a user. The images generated in this embodiment comprise views of different 'layers' of the graphical environment based on the position and orientation of the SUD 130. The following is a description of the depth peeling method and post-processing steps used in the embodiment shown in FIG. 1.

Figure 3:
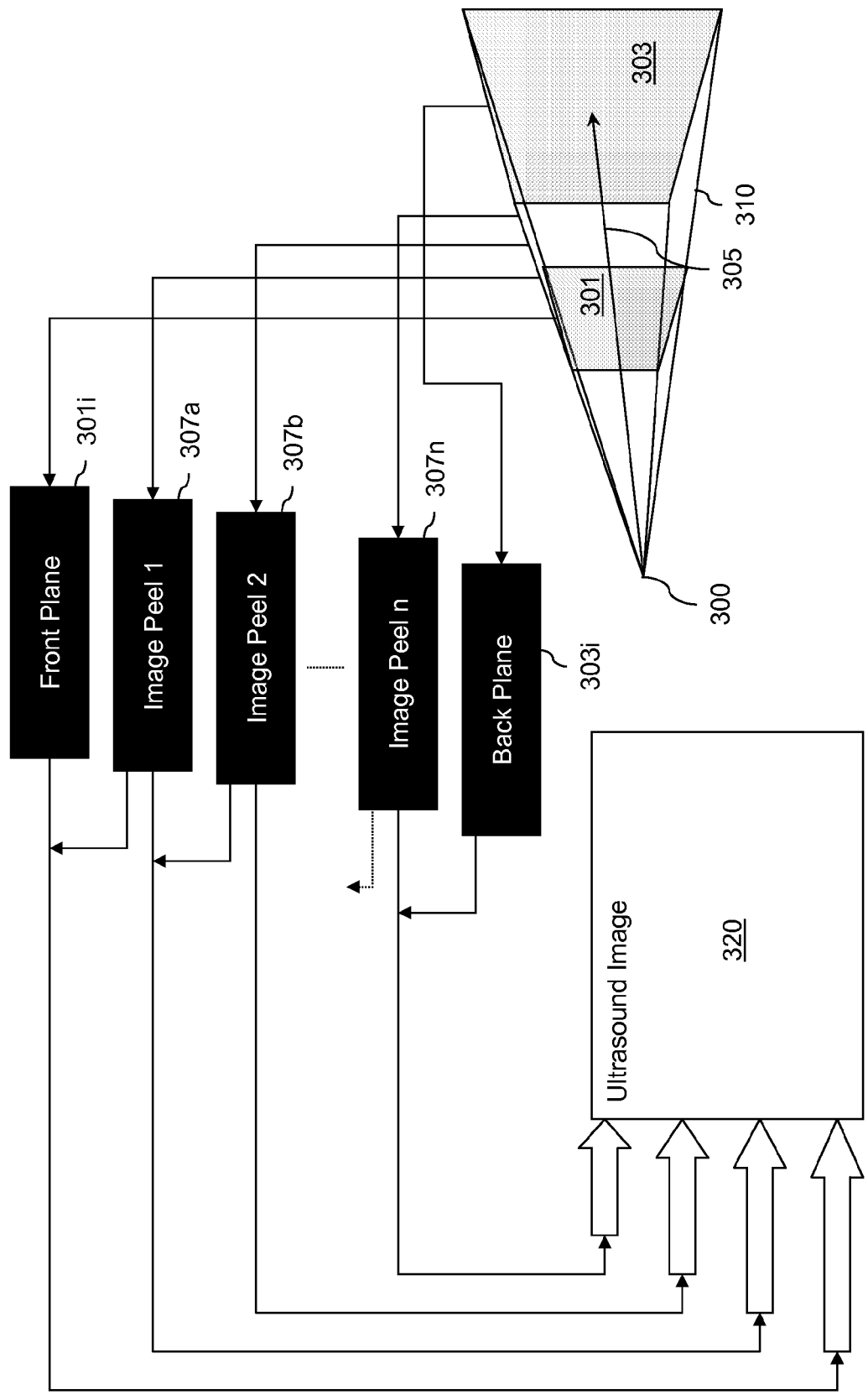
FIG. 3 shows a diagram of depth peeling according to one embodiment of the present invention.

After a position and orientation of the SUD 130 has been received, the system 100 can determine a position and orientation of a virtual camera within the virtual environment. From the perspective of the virtual camera, the system generates a simulated ultrasound image by determining and processing successive pairs of peels beginning with peels closest to the perspective of the camera. FIG. 3 shows a conceptual illustration of depth peeling.

FIG. 3 shows a diagram of a depth peeling technique according to one embodiment. In FIG. 3, a frustum 310 (such as an OpenGL View frustum) is shown in which virtual objects lie between a near plane 301 and a far plane 303. In the embodiment shown in FIG. 3, the method creates an image of a horizontal slice along a transverse plane through those objects. In one embodiment, a front plane image 301$i$, a back plane image 303$i$, and a series of depth-peel images 307$a$-307$n$ (Image Peel 1, Image Peel 2, . . . . Image Peel n) are rendered. Each peel is a rendered image of the same scene at a different depth (from front to back). Then, in one embodiment, an ultrasound image 320 is built from pairs of image peels. In this embodiment, the updates are done in order of the peels. In some embodiments, the peels are identified first and pixel attribute calculations are determined for consecutive pairs of peels afterwards. The image created by the following method is of the cross-section created along the transverse plane.

To identify peels, the system identifies which of the virtual objects are visible by the virtual camera. In some configurations, virtual objects may be partially or totally obstructed from view of the camera by one or more intervening virtual objects. In this example, the virtual environment comprises two virtual objects, object A and object B, each comprising a sphere. For this description; object A totally obstructs object B from view of the camera at the current perspective point.

After the system has identified that object A is visible by the camera, the system identifies a first peel. A peel represents a surface that is visible to a camera at its location and orientation. Thus, the first peel comprises the polygons or parts of polygons that define the visible surface of object A. Since object A is a sphere, the polygons or parts of polygons that define the visible hemisphere of object A comprise the first peel. The computer 110 stores information about the first peel, such as which polygons or parts thereof and corresponding vertexes make up the peel and their distance from the camera. After the first peel has been determined, the computer 110 determines a second peel using the same process—the computer 110 determines which polygons are visible to the camera by tracking the polygons in the previous peel that were nearest the camera and selects the polygons or parts of polygons that are the next nearest the camera but were not part of the previous peel. In this example, the polygons that make up the inside of the rear hemisphere of object A comprise the second peel. Because object B is totally obstructed by object A, no portion of object B is visible and, thus, none of its polygons are part of either the first peel or the second peel.

Once the computer 110 has determined the first peel and the second peel, the computer 110 determines characteristics for each of the pixels located within the peels, i.e. the pixels located on the surface of the sphere, and each of the pixels located between the peels, i.e. the pixels located within the sphere. Note that because the simulated ultrasound images are cross-sectional images of an object, only pixels along the cross-sectional plane are included in the simulated image. For example, in one embodiment, the computer 110 determines a color of each pixel on the peels and between the peels along the cross-sectional plane. To determine characteristics of the peels, the computer 110 retrieves information about each of the virtual objects represented by the two peels. In this example, only object A is represented by the peels. For example, in one embodiment, the computer 110 retrieves intensity information about the object. Because an object represents a physical object, it may have characteristics that affect its display in an ultrasound image. For example, data about an object may include density of the object or an indicator of the object's permeability to ultrasound waves.

After analyzing the information about the object, the computer 110 can determine an intensity of a particular pixel based on its location on or between the two peels. For example, a pixel near the second peel may be darker than a pixel near the first peel because less ultrasound energy reaches the pixel near the second peel because it must pass through more intervening tissue.

After processing the pixels on and within the first and second peels, the computer 110 identifies the next pair of peels and repeats the process. In this example, the computer 110 re-uses the polygons associated with the second peel and identifies a third peel based on which polygons are visible to the camera. Because the first and second peels represented the entire first sphere of object A, the third peel comprises the polygons that make up the visible hemisphere of the second sphere, object B. Thus, any pixels between the two spheres may be processed. The computer 110 then discards the second peel and re-uses the third peel.

The processor 111 then removes the polygons of the third peel and identifies the polygons of a fourth peel. In this example, the inside of the rear hemisphere of object B make up the fourth peel. As was done for the pixels between the first peel and the second peel, the computer determines characteristics of the pixels between the third peel and the fourth peel, such as intensity and color. In this embodiment, because the third and fourth peels were obscured by the first and second peels, the information about object A is used to computer characteristics of pixels on and between the third and fourth peels. For example, density information about object A may be used to calculate characteristics of pixels on and between the third and fourth peels. Because object B is "behind" object A, it will likely receive less ultrasound energy because some energy will have been absorbed by object A, and the amount of energy absorbed by object A will depend, at least in part, on the density of object A. After characteristics of pixels on and between the third and fourth peels are computed, because no virtual objects remain in the environment, the system generates an unfiltered image based at least in part on the pixel characteristics generated during the depth peeling process. In some embodiments, pixels that were not located on or between peels are given default values for their associated characteristics. For example, in one embodiment, such pixels are given a minimum intensity value for one characteristic.

After the unfiltered image has been generated, a Doppler effects may be added to the image. Doppler effects simulate movement of objects within the virtual environment and virtual objects, such as blood flowing through blood vessels. To apply Doppler effects, characteristics associated with vertex information for each object is analyzed. In one embodiment, each vertex comprises a vector indicating a direction of blood flow. The vector information is analyzed and pixels associated with the vector, such as pixels within a polygon partially bounded by the vertex, may have characteristics altered based on the vector information. For example, an intensity characteristic may vary over time for pixels associated with a vector to provide an indication of blood flow. Thus, pixel characteristics for one or more pixels in the unfiltered image are modified based at least in part on the Doppler process to great Doppler image.

After the Doppler process has been executed, filters are applied to the Doppler image. For example, a blur filter may be applied to soften sharp edges of the virtual objects. In addition, a noise filter may be applied to simulate noise commonly seen in ultrasound images. Erosion filters may be used as well to help eliminate graphical artifacts that may appear throughout the image generation process. Still further filters may be applied as well to generate desirable visual effects.

After the filters have been applied, the filtered image is transmitted to display 120. Since an ultrasound procedure may generate a real-time video of the interior of the patient, in one embodiment the simulation software generates a series of simulated ultrasound images to simulate the real-time video display a user would see in practice. These series of images may be generated and displayed at a rate similar to the images created by an ultrasound machine, or at a faster or slower rate, such as in a slow-motion view of an ultrasound simulation, or to provide high-quality video with a high frame rate.

Illustrative Method for Ultrasound Simulation Using Depth Peeling

A more detailed description of the ultrasound simulation process is given below with respect to FIG. 4. The method shown in FIG. 4 will be described with respect to the system shown in FIG. 1.

Figure 4:
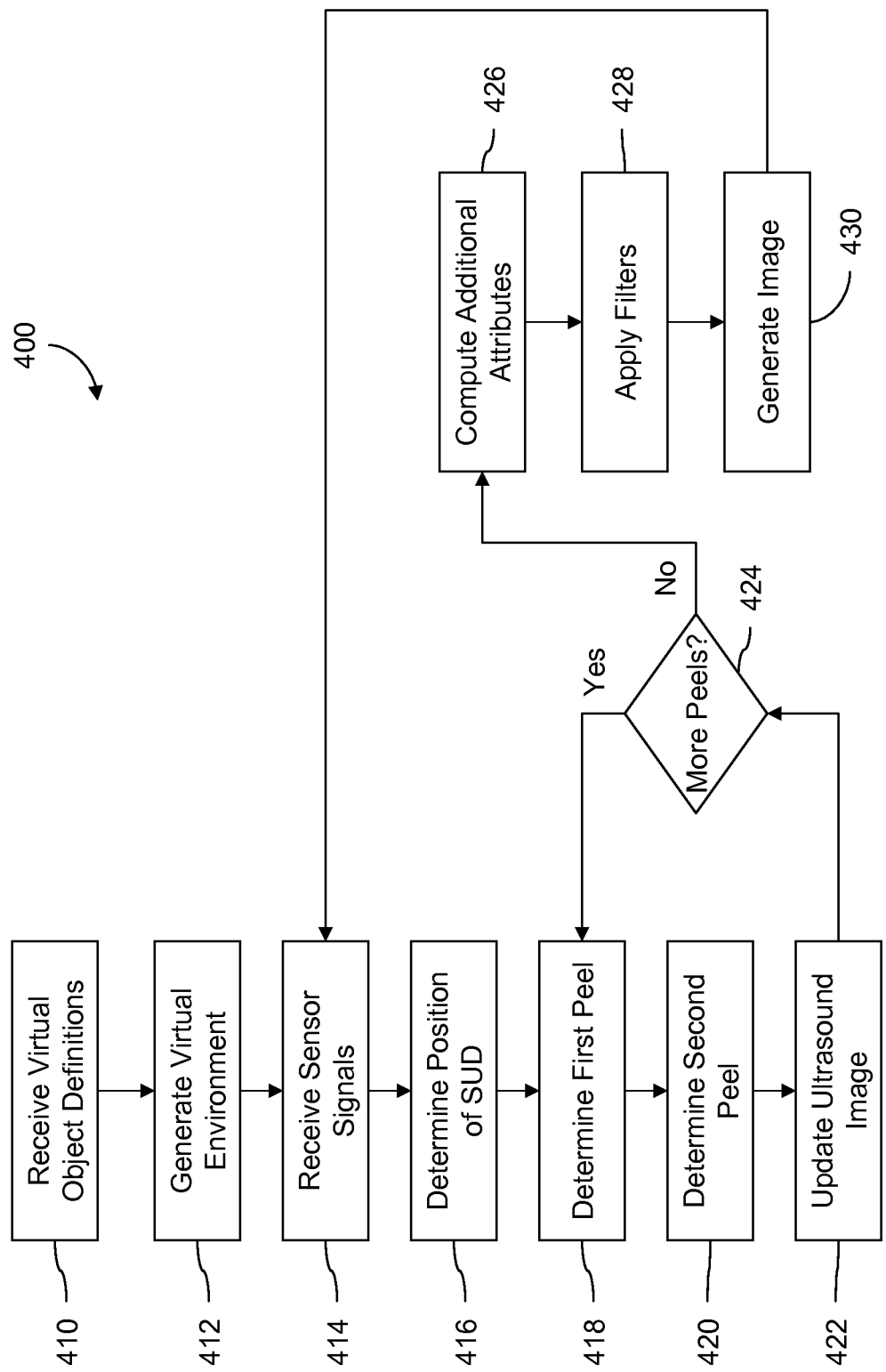
FIG. 4 shows one embodiment of a method for ultrasound simulation using depth-peeling.

Referring now to FIG. 4, FIG. 4 shows a method 400 for ultrasound simulation using depth peeling. The method begins at step 410 when the processor 111 receives definitions of one or more virtual objects, such as objects within an area of interest to the ultrasound procedure. For example, an obstetric ultrasound simulation may comprise objects within a patient's abdomen, while a thoracic ultrasound may comprise objects within the patient's chest, such as lungs, ribs, and heart. In one embodiment, an ultrasound simulation may comprise an invasive ultrasound simulation. For example, an ultrasound probe may be inserted into a patient's esophagus and have the ability to perform 360 degree scans around an axis of rotation. In one embodiment, the system 100 may read information describing the objects from a computer-readable medium, such as a hard disk. Or, in one embodiment, the system 100 may receive the information from a remote computer, such as over the Internet from a web server.

After receiving the object definitions, the method 400 proceeds to step 412 when the system 100 generates a virtual environment based on the virtual objects. For example, in one embodiment, the processor 111 receives information describing the position and orientation of the virtual objects. The processor 111 constructs a virtual environment comprising the one or more virtual objects based on the position and orientation information. In addition, the processor may receive other characteristics of the virtual objects that may be used when generating the virtual environment or when generating the simulated ultrasound images, such as texture map information. Such texture map information may comprise color, a type of object and, or an object ID of the object.

After the virtual environment is generated, the method 400 moves to step 414. A user contacts the simulated patient device 140 with the SUD 130. Sensors 141-144 within the simulated patient device 140 detect the presence of the SUD 130 and transmit sensor signals to the computer 110. The computer 110 receives the sensor signals from the sensors 141-144. The sensor signals may comprise information describing a distance from the sensor to the SUD 130. In one embodiment, the SUD 130 may emit signals that are received by the sensors 141-144. In such an embodiment, the sensors 141-144 may each transmit to the computer 110 a parameter comprising an arrival time of the received signal. In one embodiment, the sensors 141-144 comprise contact sensors. In such an embodiment, the sensors 141-144 may transmit sensor signals to the computer 110 indicating a pressure on the sensor. In a further embodiment, the SUD 130 may comprise one or more receivers configured to receive signals emitted by sensors 141-144. The SUD 130 may then transmit sensor signals to the computer indicating a time of arrival or time difference of arrival of signals received at the SUD 130 from the sensors 141-144. After the sensor signals have been received, the method 400 proceeds to step 416.

At step 416, the position and orientation of the SUD 130 are determined. For example, in one embodiment of the present invention, the system 100 determines the location of the SUD 130 by triangulation or trilateration based on the sensor signals. For example, in one embodiment in which the SUD 130 emits signals that are received by the sensors, the computer 110 may determine a position of the SUD 130 using triangulation. In one embodiment, the system 100 determines the location of the SUD 130 by determining the location of contact sensors indicating a pressure greater than a threshold. The computer 110 may also determine an orientation of the SUD 130. For example in one embodiment, the SUD 130 may comprise a sensor capable of determining an orientation of the SUD 130, such as a gyroscopic sensor.

In a further embodiment, the simulated patient device 140 may comprise a processor that receives sensor signals and determines a position and orientation of the SUD 130 based on the received sensor signals. The processor disposed within or in communication the simulated patient device 140 transmits the position and orientation information to the processor 111 in the computer. After receiving the position and orientation information, the processor 111 determines a location and orientation of a perspective point in the graphical environment from which to base the simulated ultrasound image. Once the processor 111 has received the position and orientation information and determined the perspective point, it may begin generating a simulated ultrasound image.

At step 418, the processor 111 determines the first peel of a pair of peels. The first peel is associated with one or more virtual objects within the graphical environment. As described above, the first peel comprises polygons that are visible from the perspective point. The peel may comprise upper surfaces of one or more virtual objects within the scene. In the embodiment shown in FIG. 4, each virtual object comprises a plurality of polygons, as described above, as well as an object identification number, or object ID. The object ID may be used to identify characteristics of the object at various times during the image generation process, such as for determining density or color of the virtual object. Thus, the processor 111 associates an object ID with each pixel that is part of the first peel. After the processor has determined the first peel, the method 400 proceeds to the step 416.

In step 420, the processor 111 identifies the second peel of the pair of peels. As described above, to determine the second peel, polygons that are part of the first peel are removed and the set of visible polygons from the perspective point become part of the second peel. Again, like in the first peel, polygons in the second peel may be associated with one or more virtual objects. Thus, the processor associates an object ID with each of the pixels in the second peel. After the second peel has been determined, the method proceeds to step 422.

In step 422, the processor 111 updates the simulated ultrasound image. If the processor 111 is processing the first set of peels, the simulated ultrasound image may be empty or comprise default pixel values that would cause an empty screen to be displayed to a user. To update the ultrasound image, the processor 111 applies attributes to pixels within a buffer storing the simulated ultrasound image. In this embodiment, each of buffer locations corresponding to a pixel within the first and second peels are assigned characteristics based on characteristics of the first and second peels. For example, if a pixel associated with virtual object ID 4 in the first peel, the buffer location may be updated to include intensity or color information based on information associated with virtual object ID 4. In some embodiments, a virtual object, such as a needle, may be partially or completely located within another object. In such an embodiment, it may be particularly important to track object IDs on a per-pixel basis to ensure the proper object characteristics are used when determining pixel characteristics.

After the processor 111 has updated buffer locations associated with the first and second peels, the processor 111 updates buffer locations based on pixels located between the first and second peels. As discussed above, pixels located between the first and second peels, referred to as interior pixels, may be associated with a particular virtual object and, in one embodiment, are assigned an object ID based on the object ID of a pixel in the first peel or the second peel.

As the interior pixels are processed, buffer locations associated with the interior pixels are updated based on the characteristics of the interior pixels, such as intensity, color and object ID. In addition, as discussed above, because pixels further from the perspective point may receive less ultrasound energy than pixels closer to the perspective point, characteristics of pixels may be based on distance of the pixel from the perspective point as well as density information associated with the object ID and density information associated with pairs of peels and pixels between such pairs of peels that had been previously computed.

After the simulated ultrasound image has been updated, the method proceeds to step 424 where the processor 111 determines whether additional peels remain in the graphical environment. If there are additional peels, in one embodiment, the method returns to step 418. In another embodiment, the processor 111 may determine that additional peels remain, but that a maximum depth in the graphical environment has been reached and that no peels remain that are at less than the maximum depth. In such an embodiment, the method may proceed to step 426. In another embodiment, the processor may process all peels regardless of depth.

In one embodiment of the present invention, after completing the peel analysis, additional peel analysis may be performed to generate a plurality of intermediate images. The plurality of images may be generated from a viewpoint on either side of the image generated based on the viewpoint of the SUD 130. For example, an actual ultrasound probe does not probe in a perfect 2-dimensional plane, but rather along a narrow three-dimensional scan volume. Thus, a plurality of images at one or more small distances from a two-dimensional plane positioned based on the location and orientation of the SUD 130 may be generated. These images may then be averaged together to create a single image which may then be processed with post-processing filters and effects.

In some ultrasound procedures, an ultrasound image may be generated by a rotating ultrasound probe, such as in an arc or in a 360 degree rotation about an axis. Such a procedure may be employed when using an ultrasound probe inserted into a patient's esophagus. To simulate such a procedure, one embodiment of the present invention, a plurality of ultrasound images may be generated based on a position of the SUD and at intervals through a rotation around an axis. For example, a plurality of images may be generated and stitched together at the edges to create a 180-degree or 360-degree image of a patient. For example, in one embodiment, four images may be generated, wherein each image is at 90 degree rotational offsets from a first detected position and orientation of the ultrasound probe. The edges of each successive image may be appended to the next image to generate a 360-degree view of the area of interest.

In one embodiment, after all of the peels have been computed and all of the attributes for pixels between peels have been determined, a basic ultrasound image may be displayed. For example, FIGS. 5 and 6 show simulated images of ultrasound simulation using depth peeling according to different embodiments of the present invention.

Figure 5:
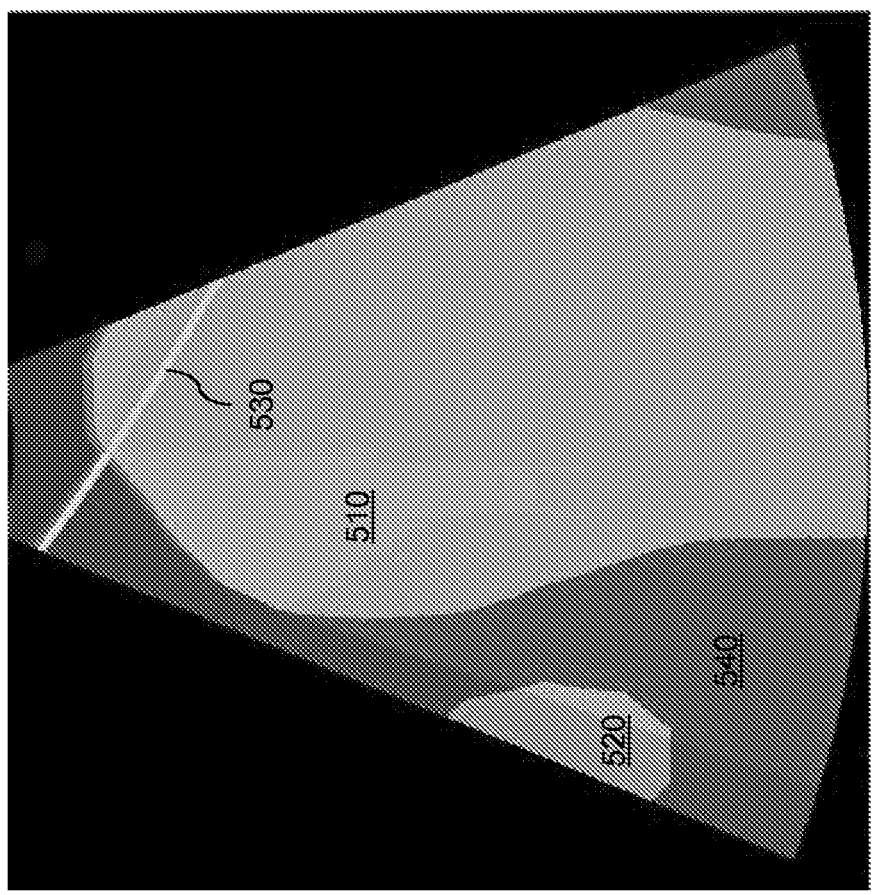
FIGS. 5-11 show simulated images of ultrasound simulation using depth peeling according to different embodiments of the present invention.
Figure 6:
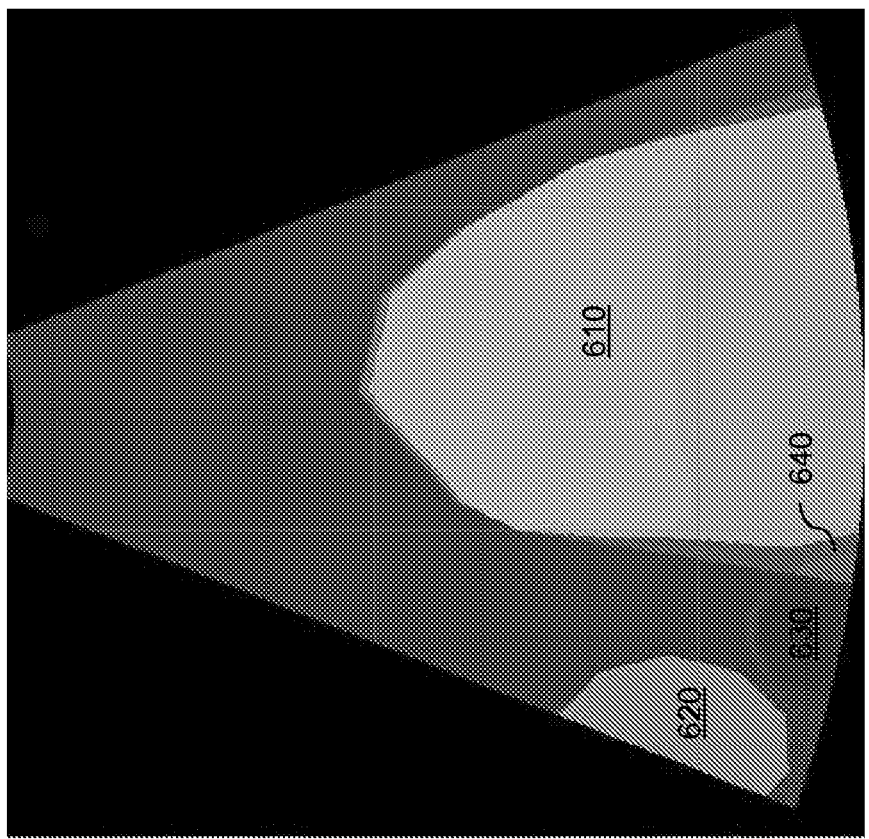

Referring now to FIGS. 5 and 6, FIGS. 5 and 6 show examples of simulated ultrasound images that have been generated after no more peels are available to be processed. As can be seen in FIG. 5, three virtual objects may be seen in the image: two internal organs 510, 520 and a needle 530. In the embodiment shown in FIG. 5, the camera is located at the top of the image. As simulated ultrasound waves travel away form the SUD 130, they encounter the various virtual objects within the virtual environment and may be absorbed or reflected. As can be seen, pixels further form the perspective point tend to be darker, indicating that less ultrasound energy reaches them. As can also be seen, the bottom of the image cuts out part of virtual object 510. As described above, in one embodiment, the processor 111 may only determine characteristics of pixels up to a maximum depth. If a peel goes beyond the maximum depth, part or all of the peel may be truncated such that the maximum depth is used instead of the portion of the object that would comprise the second peel. For example, part of object 510 continues below the maximum depth, however, the maximum depth of the image may be used in place of the second peel. However, in another embodiment, the second peel may be used, and pixels located beyond the maximum depth may be ignored when the image is generated. In addition to the objects, it can be seen that objects may absorb or prevent passage of ultrasound energy, which may affect the display of other objects. For example, the needle 530 absorbs or prevents a significant amount of energy from reaching object 510, thus the right side of object 510 appears darker than the left side of object 510. Further, because object 510 itself absorbs energy, a "shadow" 540 is evident on the left side virtual object 510, part of which intersects virtual object 520.

Similarly, FIG. 6 shows a simulated image of an ultrasound simulation using depth peeling according to one embodiment of the present invention. FIG. 6 also comprises 3 virtual objects, 610-630, as well as a "shadow" 640 cast by virtual object 610. Again, each of the virtual objects 610-630 is generated based on the characteristics of the object IDs of the virtual objects 610-630, including color and intensity.

In step 426, the processor 111 computes additional per-pixel attributes and stores them in the buffer holding the simulated ultrasound image. These attributes include Doppler attributes based on objects within the scene, identified by the object ID attributes as well as user-specified parameters. For example, a user may specify a parameter to modulate a velocity parameter of a virtual object, or of a part of a virtual object, to simulate a heartbeat or blood flow. Thus, pixel attributes in the simulated ultrasound image are stored with the Doppler effect parameters. Over time, the image of the object will change as parts of the object move based, for example, on velocity and user-defined parameters.

For example, in one embodiment, one or more polygons or vertices may have associated vectors indicating a direction of blood flow. In step 426, the processor 111 identifies such vectors and determines or modifies values of pixel characteristics associated with the vectors, such as pixels within the one or more polygons, or pixels associated with the vertex, such as pixels within a certain distance of the vertex. In such an embodiment, the processor 111 may vary a characteristic of a pixel over successive simulated ultrasound images to simulate blood flow or movement or deformation of a virtual object. For example, in one embodiment, a virtual environment may comprise a virtual object representing a fetus. Vectors associated with the fetus may indicate circulation of blood within the fetus. In another embodiment, other parameters indicate movement or deformation of a virtual object. For example, a fetus may move within a uterus, such as by kicking. One or more parameters associated with a virtual object may be updated based on such movement or deformation.

After calculating Doppler parameters, the method 400 continues to step 428 in which the processor 111 generates an intermediate image comprising the pixel characteristics determined during the depth-peeling steps and the Doppler characteristics. For example, in one embodiment, the intermediate image is rendered to a screen space quad. Various filters may then be applied to the intermediate image. In the embodiment shown in FIG. 4, a box blur filter is applied to each pixel in the initial image, including any pixels that were not processed as part of the depth peeling process. Such pixels include pixels that did not fall between any two peels during the depth peeling process.

Figure 7:
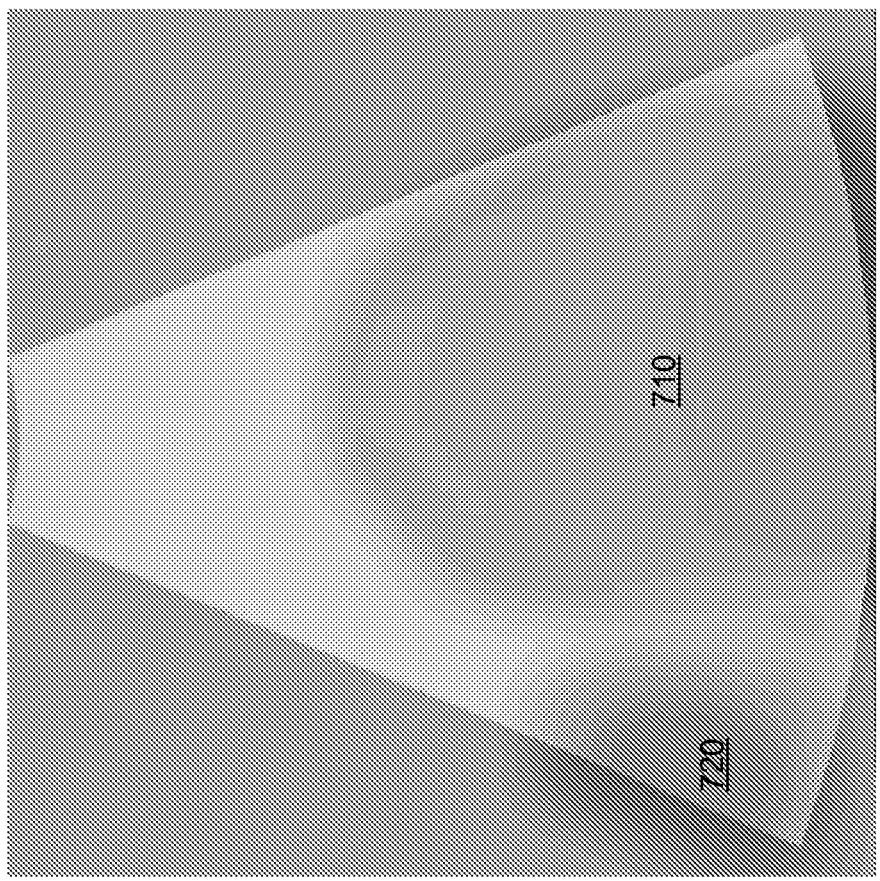

In this embodiment, each pixel's attribute values are averaged with the attribute values of pixels adjacent to the pixel being filtered. FIG. 7 shows a simulated image of an ultrasound simulation using depth peeling according to one embodiment of the present invention. As can be seen, the edges of the virtual objects 710, 720 in the image have been blurred and provide a more realistic rendering of the objects and shadowing. The new values are stored for each pixel in the intermediate image. In some embodiments, only some pixels in the intermediate image are filtered with a box filter. For example, a parameter associated with an object ID may determine whether pixels associated with the object are blurred or the extent of blurring.

In one embodiment, a virtual object representing a needle may comprise a characteristic indicating that a box blur should not be applied to the needle. In such an embodiment, pixels associated with the needle are not blurred, which may more accurately represent how a needle would be displayed in an actual ultrasound procedure. In one embodiment, each object ID may comprise a parameter defining the size of the blur filter. For example, in one embodiment an object ID may specify that a box blur filter comprises pixels within 2 pixels of the blurred pixel be analyzed by the filter. Additionally, a location of a pixel within the image may help determine whether the pixel is blurred. For example, pixels at the edges of the ultrasound image may not be blurred to provide a sharp edge to the ultrasound image. In some embodiments, a Gaussian blur filter is applied instead of a box blur.

In the embodiment shown in FIG. 4, in addition to a box filter, an erosion filter is also applied to the intermediate image. In this embodiment an erosion filter analyzes a first pixel and each pixel adjacent to the first filter. It determines the pixel with the lowest characteristic value (such as intensity characteristic values), and replaces the first pixel's characteristic values with the lowest characteristic values from its adjacent pixels. Such an embodiment can eliminate or reduce the effect of pixel artifacts resulting from other filters, or can reduce the extent of a blurry edge to an object. Additionally, such an embodiment may simulate the effect of lower blood flow velocities near blood vessel walls. In some embodiments still further filters may be applied. After the pixel characteristics have been modified by the box and erosion filters, the filtered pixel characteristics are stored in a frame buffer and the method 400 proceeds to step 430.

Figure 8:
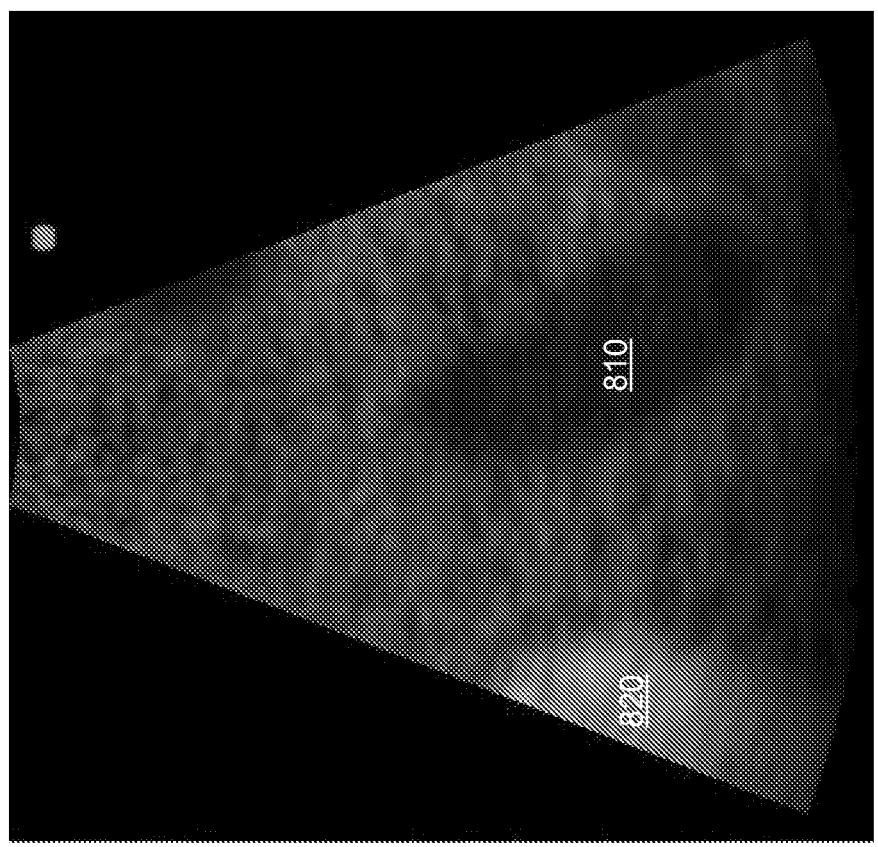
Figure 9:
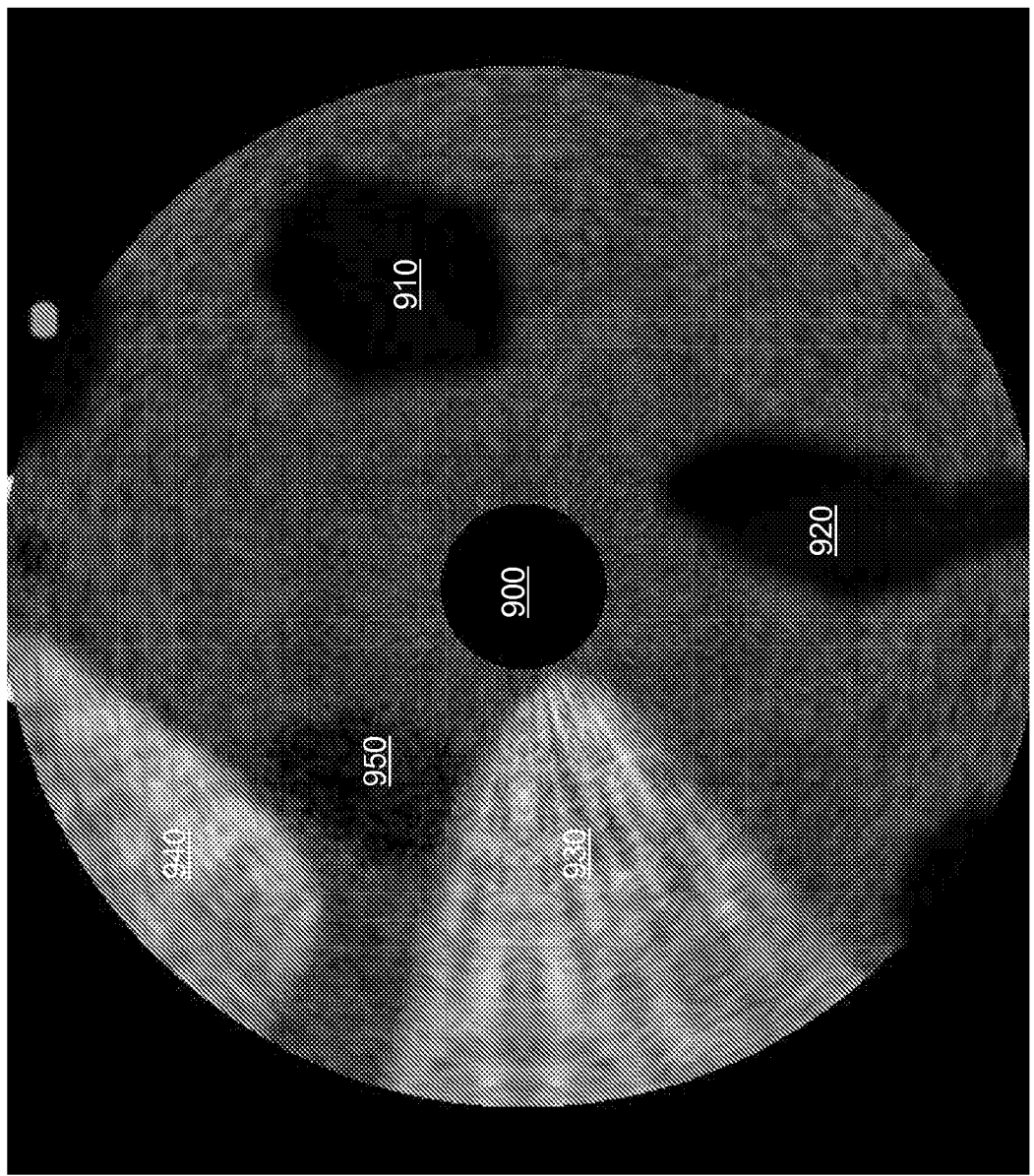
Figure 10:
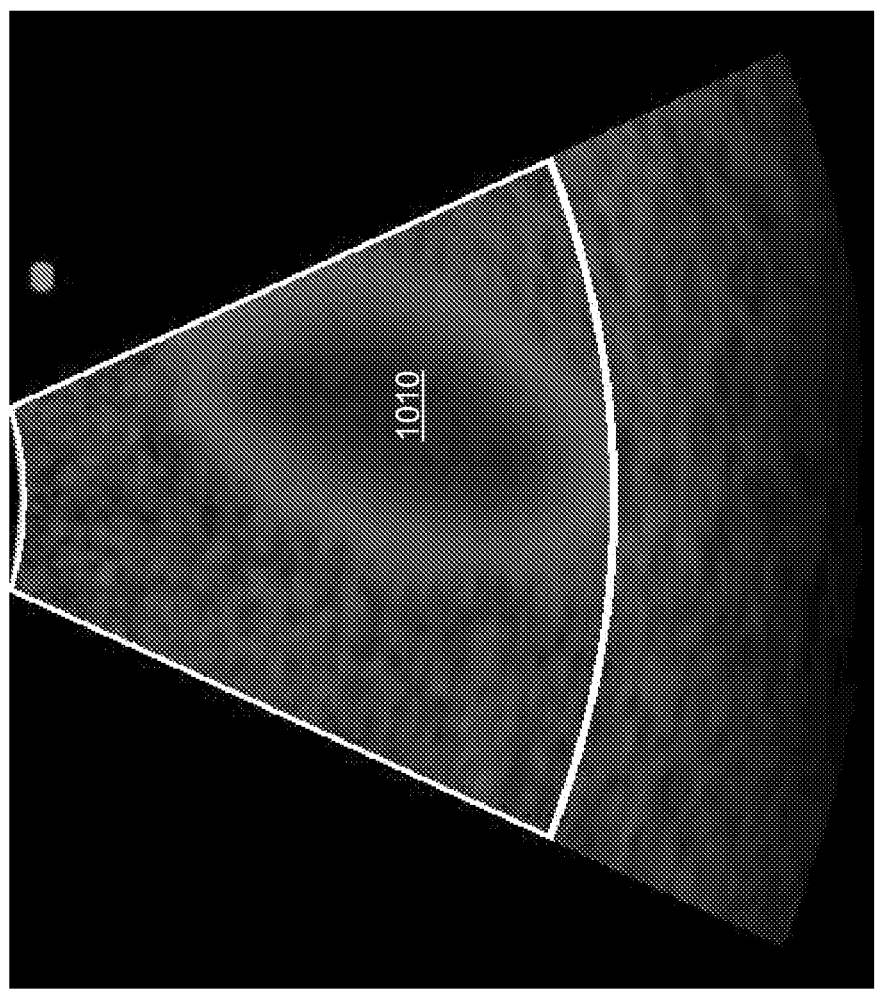

In step 430, the processor 111 generates a final ultrasound image. In this embodiment, the pixel characteristics resulting from step 428 are passed through a noise function and combined with the Doppler characteristics to determine a final color and intensity for each pixel in the image. For example, in one embodiment of the present invention, the pixels in the frame buffer from step 428 are input into a Perlin noise function. FIGS. 8 and 9 show simulated images of an ultrasound simulation using depth peeling according to one embodiment of the present invention. As can be seen in FIG. 8, two virtual objects 810, 820 have been processed and are visible as the might appear during an actual ultrasound procedure. The noise function provided a slightly splotch pattern to the image to simulate minute variations of ultrasound absorption or reflection across the image of the simulated procedure. The simulated ultrasound image in FIG. 9 shows an embodiment using a 360-degree ultrasound simulation. As can be seen, the ultrasound probe is located in the dark circle 900 at the center of the image. Virtual objects 910-950 within the virtual environment are located around the ultrasound probe and the image has been generated using the method 400 shown in FIG. 4. The embodiment shown in FIG. 9 comprises an intermediate ultrasound image to which a noise filter has been applied.

After applying the noise filter, the output from the noise filter is modified using the Doppler characteristics determined in step 426, and the final pixel attribute information is stored in the final frame buffer and transmitted to the display to be displayed. FIG. 9 shows a simulated image of an ultrasound simulation using depth peeling according to one embodiment of the present invention. As can be seen in FIG. 8, a virtual object 810 has been processed both with a noise function and corresponding Doppler characteristics. Over time the image will change size and shape depending on blood flow or user-specified parameters. As a result, pixel colors and intensities in the object will change to reflect the changing shape of object.

Some embodiments of the present invention may comprise variations of the method shown in FIG. 4. For example, some embodiment may include additional steps, such as additional filters or post-processing effects, or the steps may be performed in different orders. In addition, some embodiments may comprise objects with different properties. For example, FIG. 11 shows a simulated ultrasound image according to one embodiment of the present invention.

Figure 11:
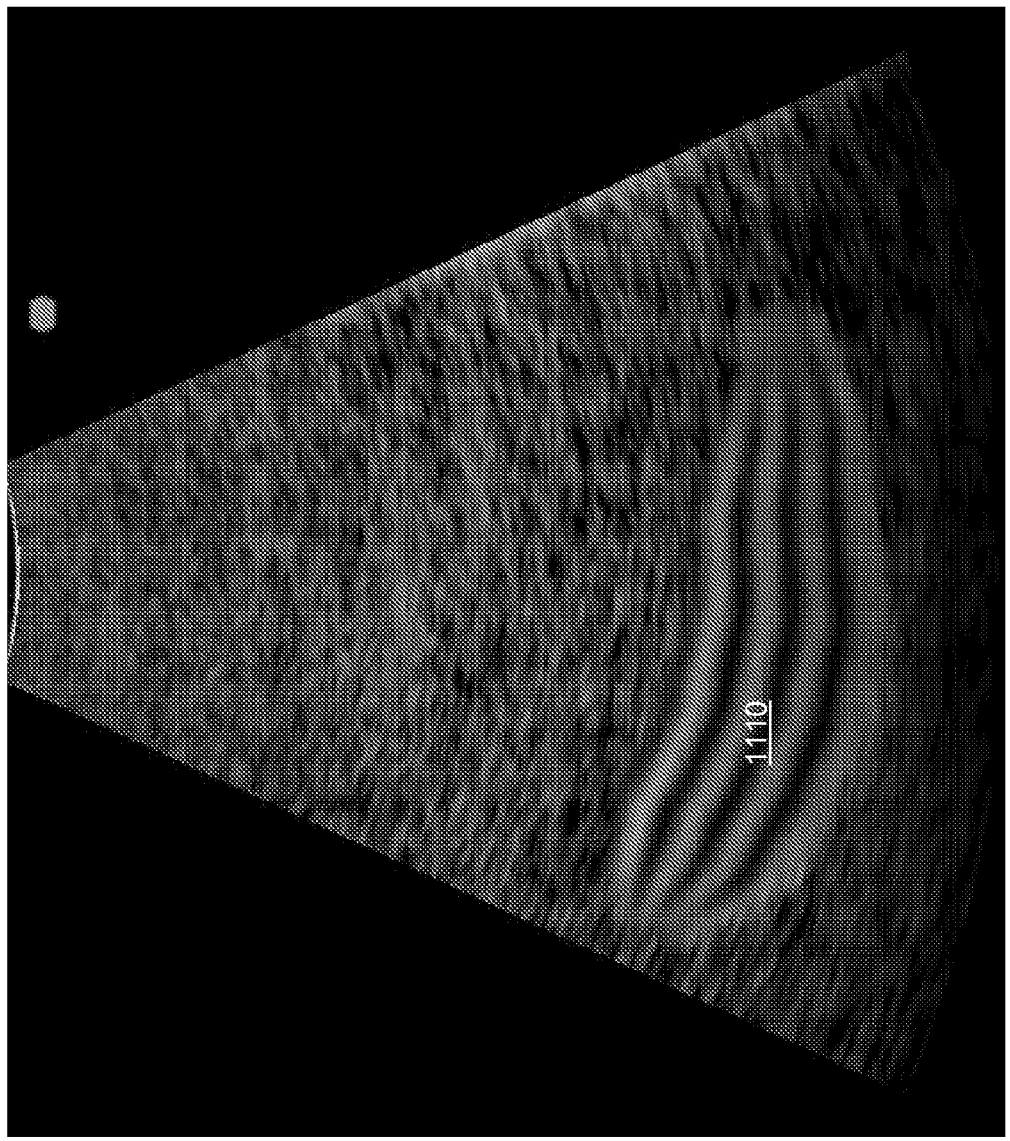

In the embodiment shown in FIG. 11, a virtual object 1110 comprises a plurality of layers, such as to simulate an internal organ with different types of tissue layers, such as a stomach. While such an object could be represented by multiple objects or multiple surfaces with similar shapes located concentrically within one another, such a process will generally require greater processing power. Thus, it may be advantageous to model an object, such as the stomach, with a single virtual model and assign layer characteristics to one or more polygons associated with the model. For example, some of the polygons comprising the model may have a plurality of layers. Each layer may then be drawn onto a rendered surface of the object to simulate the layers of tissue.

While the methods and systems herein are described in terms of software executing on various machines, the methods and systems may also be implemented as specifically-configured hardware, such a field-programmable gate array (FPGA) specifically to execute the various methods. For example, referring again to FIG. 1, embodiments can be implemented in digital electronic circuitry, or in computer hardware, firmware, software, or in combination of them. In one embodiment, a computer may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

General

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A method comprising:
receiving a sensor signal comprising a position and an orientation of a simulated ultrasound device, the position and orientation associated with a virtual physical environment comprising a first virtual object;
based on the sensor signal:
determining a first peel associated with the first virtual object;
determining a second peel associated with the first virtual object;
determining characteristics of pixels located between the first peel and the second peel based at least in part on the first or second peel; and
generating a display signal based on the characteristics, the display signal configured to cause a visual display of the virtual physical environment; and
outputting the display signal to a display device.

2. The method of claim 1, further comprising:
determining a third peel associated with a second virtual object;
determining a fourth peel associated with the second virtual object;
determining characteristics of pixel located between the third peel and the fourth peel based at least in part on one of the third or fourth peel;
wherein generating the display signal is further based on the characteristics of the pixels located between the third peel and the fourth peel, and
wherein the virtual physical environment further comprises the second virtual object.

3. The method of claim 2, wherein the first virtual object is located in front of the second virtual object.

4. The method of claim 1, wherein determining the characteristics are based on depths of the respective pixels between the first peel and the second peel, a first peel density, an accumulated density, and priority information.

5. The method of claim 1, wherein generating the display signal further comprises post-processing the characteristics.

6. The method of claim 5, wherein post-processing comprises at least one of applying a noise filter, applying a blur filter, applying a Doppler algorithm, or applying an erosion filter.

7. The method of claim 1, wherein the simulated ultrasound device is configured to simulate an ultrasound device capable of taking an ultrasound image in 360 degrees.

8. A system comprising:
a simulated ultrasound device;
a processor in communication with the simulated ultrasound device, the processor configured to:
receive a sensor signal comprising a position and an orientation of a simulated ultrasound device, the position and orientation associated with a virtual physical environment comprising a first virtual object;
based on the sensor signal:
determine a first peel associated with the first virtual object;
determine a second peel associated with the first virtual object;
determine characteristics of pixels located between the first peel and the second peel based at least in part on the first or second peel; and
generate a display signal based on the characteristics, the display signal configured to cause a visual display of the virtual physical environment; and
output the display signal to a display device.

9. The system of claim 8, wherein the processor is further configured to:
determine a third peel associated with a second virtual object;
determine a fourth peel associated with the second virtual object;
determine characteristics of pixels located between the third peel and the fourth peel based at least in part on the third or fourth peel;
wherein the processor is configured to generate the display signal based on the characteristics of the pixels located between the third peel and the fourth peel; and
wherein the virtual physical environment further comprises the second virtual object.

10. The system of claim 9, wherein the first virtual object is located in front of the second virtual object.

11. The system of claim 8, wherein the processor is configured to determine the characteristics based on depths of the respective pixels between the first peel and the second peel, a first peel density, an accumulated density, and priority information.

12. The system of claim 8, wherein the processor is further configured to post-process the characteristics.

13. The system of claim 12, wherein the processor is configured to apply a noise filter, apply a blur filter, apply a Doppler algorithm, or apply an erosion filter.

14. The system of claim 8, wherein the simulated ultrasound device is configured to simulate an ultrasound device capable of taking an ultrasound image in 360 degrees.

15. A non-transitory computer-readable medium comprising program code, the program code comprising:
program code for receiving a sensor signal comprising a position and an orientation of a simulated ultrasound device, the position and orientation associated with a virtual physical environment comprising a first virtual object;
program code for, based on the sensor signal, determining a first peel associated with the first virtual object;
program code for, based on the sensor signal, determining a second peel associated with the first virtual object;
program code for, based on the sensor signal, determining a first characteristic of a pixel located between the first peel and the second peel based at least in part on the first or second peel;
program code for, based on the sensor signal, generating a display signal based on the first characteristic, the display signal configured to cause a visual display of the virtual physical environment; and
program code for outputting the display signal to a display device.

16. The non-transitory computer-readable medium of claim 15, further comprising:
program code for determining a third peel associated with a second virtual object;
program code for determining a fourth peel associated with the second virtual object;
program code for determining characteristics of pixel located between the third peel and the fourth peel based at least in part on the third or fourth peel;

wherein program code for generating the display signal comprises program code for generating the display signal based on the characteristics of the pixels located between the third peel and the fourth peel, and wherein the virtual physical environment further comprises the second virtual object.

17. The non-transitory computer-readable medium of claim 16, wherein the first virtual object is located in front of the second virtual object.

18. The non-transitory computer-readable medium of claim 15, wherein program code for determining the characteristics comprises program code for determining the characteristics based on depths of the respective pixels between the first peel and the second peel, a first peel density, an accumulated density, and priority information.

19. The non-transitory computer-readable medium of claim 15, wherein program code for generating the display signal further comprises program code for post-processing the characteristics.

20. The non-transitory computer-readable medium of claim 19, wherein program code for post-processing comprises at least one of program code for applying a noise filter, program code for applying a blur filter, program code for applying a Doppler algorithm, or program code for applying an erosion filter.

21. The non-transitory computer-readable medium of claim 15, wherein the simulated ultrasound device is configured to simulate an ultrasound device capable of taking an ultrasound image in 360 degrees.

\* \* \* \* \*